United States Patent
Elorza Gomez et al.

(10) Patent No.: US 10,337,519 B2
(45) Date of Patent: Jul. 2, 2019

(54) METHOD, COMPRESSOR AND TURBOMACHINE

(71) Applicant: MTU Aero Engines AG, Munich (DE)

(72) Inventors: Sergio Elorza Gomez, Munich (DE); Tim Schneider, Munich (DE)

(73) Assignee: MTU Aero Engines AG, Munich (DE)

( * ) Notice: Subject to any disclaimer, the term of this patent is extended or adjusted under 35 U.S.C. 154(b) by 400 days.

(21) Appl. No.: 15/360,688

(22) Filed: Nov. 23, 2016

(65) Prior Publication Data

US 2017/0146017 A1    May 25, 2017

(30) Foreign Application Priority Data

Nov. 24, 2015 (DE) .................. 10 2015 223 212

(51) Int. Cl.
| | | |
|---|---|---|
| F04D 19/00 | (2006.01) | |
| F04D 27/00 | (2006.01) | |
| F04D 29/54 | (2006.01) | |
| F04D 29/56 | (2006.01) | |
| F01D 5/14 | (2006.01) | |
| F04D 19/02 | (2006.01) | |
| F04D 29/32 | (2006.01) | |

(52) U.S. Cl.
CPC .......... *F04D 27/002* (2013.01); *F01D 5/146* (2013.01); *F04D 19/00* (2013.01); *F04D 19/02* (2013.01); *F04D 29/324* (2013.01); *F04D 29/541* (2013.01); *F04D 29/563* (2013.01)

(58) Field of Classification Search
CPC ........ F01D 5/146; F04D 19/00; F04D 19/002; F04D 27/002; F04D 29/324; F04D 29/541; F04D 29/563
See application file for complete search history.

(56) References Cited

U.S. PATENT DOCUMENTS

| | | | | |
|---|---|---|---|---|
| 2,990,106 A | | 6/1961 | Craig | |
| 3,112,866 A | * | 12/1963 | Fortescue | ............... F01D 5/142 |
| | | | | 415/194 |
| 4,874,287 A | * | 10/1989 | Grieb | ...................... F01D 5/142 |
| | | | | 415/149.2 |

(Continued)

FOREIGN PATENT DOCUMENTS

| | | |
|---|---|---|
| DE | 312856 | 9/1914 |
| DE | 855891 | 11/1952 |

(Continued)

*Primary Examiner* — Igor Kershteyn
(74) *Attorney, Agent, or Firm* — Davidson, Davidson & Kappel, LLC

(57) ABSTRACT

Disclosed is a method for operating a compressor of a turbomachine, in which, when viewed in the direction of a main flow, a slowly dropping degree of reaction being raised in one compressor area more quickly than previously dropped and the raised degree of reaction then being reduced again in a subsequent compressor area more slowly that it was previously raised, a compressor of a turbomachine including at least one degree of reaction rising more quickly in one compressor area in comparison to adjacent compressor areas with respectively a dropping degree of reaction, whereby a sawtooth-shaped curve of the degree of reaction results, and a turbomachine including a compressor of this type.

14 Claims, 2 Drawing Sheets

(56) References Cited

U.S. PATENT DOCUMENTS

| | | | |
|---|---|---|---|
| 5,152,661 A * | 10/1992 | Sheets | F01D 5/145 415/84 |
| 5,486,091 A * | 1/1996 | Sharma | F01D 5/142 415/181 |
| 5,984,631 A | 11/1999 | Tolgos | |
| 6,345,952 B1 | 2/2002 | Oeynhausen et al. | |
| 6,350,103 B1 * | 2/2002 | Hashimoto | F01D 5/146 415/199.5 |
| 7,264,441 B2 * | 9/2007 | Loudet | F01D 17/162 415/144 |
| 8,534,997 B2 | 9/2013 | Guemmer | |
| 8,573,941 B2 | 11/2013 | Hoeger | |
| 8,734,095 B2 * | 5/2014 | Iida | F01D 5/142 415/191 |
| 9,109,461 B2 * | 8/2015 | Takahashi | F01D 5/142 |
| 9,470,091 B2 | 10/2016 | Gomez et al. | |
| 2006/0018753 A1 * | 1/2006 | Menian | F01D 5/146 416/175 |
| 2012/0070267 A1 | 3/2012 | Takahashi et al. | |
| 2015/0219115 A1 * | 8/2015 | Roy | F01D 5/141 416/243 |
| 2017/0146025 A1 * | 5/2017 | Schneider | F01D 5/146 |

FOREIGN PATENT DOCUMENTS

| | | | |
|---|---|---|---|
| DE | 1011573 | 7/1957 | |
| DE | 1428098 | 7/1969 | |
| DE | 19701020 | 7/1998 | |
| DE | 102009013399 | 9/2010 | |
| DE | 102011120167 | 6/2013 | |
| EP | 0823540 | 2/1998 | |
| EP | 0953100 | 4/2002 | |
| EP | 2626515 | 8/2013 | |
| EP | 2833001 | 2/2015 | |
| EP | 2944824 | 11/2015 | |
| EP | 3173629 A1 * | 5/2017 | F04D 19/00 |
| GB | 710300 | 6/1954 | |
| GB | 2187237 | 9/1987 | |
| JP | 2002061594 | 2/2002 | |

\* cited by examiner

METHOD, COMPRESSOR AND TURBOMACHINE

This claims the benefit of German Patent Application DE 10 2015 223 212.3, filed Nov. 24, 2015 and hereby incorporated by reference herein.

The invention relates to a method for operating a compressor of a turbomachine, a compressor of a turbomachine, and a turbomachine.

BACKGROUND

In conventional axial compressors of turbomachines, such as aircraft engines and static gas turbines, a degree of reaction in the front compressor area drops from an inlet-side maximum to a minimum. The degree of reaction may be calculated in a simplified way according to the following formula, based on metal angles:

$$R = \frac{\tan\frac{\beta 1 + \beta 2}{2}}{\tan\frac{\beta 1 + \beta 2}{2} + \tan\frac{\alpha 1 + \alpha 2}{2}}$$

The angles $\alpha 1$, $\alpha 2$, $\beta 1$, $\beta 2$ are, as shown in FIG. 1, marked between tangents of the respective camber line and an axial flow direction x of the turbomachine. $\alpha 1$ is marked from the trailing edge of a guide blade 2 of a row of guide blades n−1. $\alpha 2$ is marked toward the leading edge of a guide blade 4 of a row of guide blades n. $\beta 1$ is marked toward the leading edge of a moving blade 6 of a row of moving blades n. $\beta 2$ is marked from the trailing edge of moving blade 6 of a row of moving blades n. Moving blade 6 or row of moving blades n thereby passes through between guide blades 2, 4 or rows of guide blades n−1, n in circumferential direction u. Letter n designates whole number multiples of 1, 2, etc. Usually, the degree of reaction for compressors covers a range between 0.5 and 1.0. Turbines usually cover degrees of reaction from 0.0 . . . 0.05 through 0.5. The drop of the degree of reaction upstream from the first not adjustable guide baffle is followed by a rise of the degree of reaction up to the compressor outlet in known turbomachines. Due to the rise, a residual swirl in the main flow may be reduced in the rear compressor area and in particular at the outlet guide baffle of the compressor; however, the rise causes a high load on the rear stages, which results in stability and efficiency limitations. In order to achieve a required stability, the rear guide baffles require a high number of blades.

It is the object of the present invention to create a method for operating a compressor of a turbomachine, with the aid of which a high stability and a high efficiency may be achieved. In addition, it is the object of the present invention to create a compressor of a turbomachine which has both a high stability and a high efficiency, and to create a turbomachine with a high stability and a high efficiency.

SUMMARY OF THE INVENTION

It is an object of the present invention to provide a method for operating a compressor of a turbomachine, when viewed in the direction of a main flow, a slowly dropping degree of reaction in one compressor area is quickly raised and the raised degree of reaction is then slowly reduced again. A high degree of reaction indicates a high stability and low sensitivity, which has a particularly favorable effect at a partial load. Pumping is, for example, effectively prevented.

The slow or slower drop of the degree of reaction following the sharp rise indicates a relief for the rear guide baffles. Consequently, these may have a reduced number of blades or a smaller axial width; whereby losses are reduced, which results in an improvement in efficiency. The abrupt rise of the dropped degree of reaction with the aid of the front highly-deflecting guide baffle may basically be carried out to an arbitrarily high level. A level comparable to the compressor inlet-side, original, high degree of reaction is preferable.

The stability may be further improved if the degree of reaction is quickly raised several times and each time slowly drops after the rise. This is advantageous, in particular, in long compressors or compressors with a high number of stages, the drop taking place across more stages than the rise.

In order to achieve a favorable incident flow of a combustion chamber area, it is advantageous if a swirl of the main flow is decreased after a slow drop of the degree of reaction.

A compressor of a turbomachine according to the present invention has at least one highly-deflecting guide baffle for raising a degree of reaction, the guide baffle being situated between a front compressor area and a rear compressor area, in which the degree of reaction respectively slowly drops, when viewed in the direction of the main flow. The front compressor area and the rear compressor area preferably do not have highly-deflecting guide baffles or are free of highly-deflecting guide baffles. They may, however, also have highly-deflecting guide baffles which likewise enable a slow drop in the degree of reaction. The wording, "slowly drops" or "slowly dropping" does not thereby explicitly mean that the degree of reaction slowly drops equally in the front compressor area and the rear compressor area. Identical and also different degrees of the drop are possible.

"Highly-deflecting" means, in particular, a de Haller number lower than 0.65, alternatively a degree of diffusion greater than 0.6. The non-highly-deflecting guide baffles preferably have a de Haller number greater than 0.70. The quotient (v2/v1) of an inflow velocity v1 of a cascade and an inflow velocity v2 of the cascade is the de Haller number. The compressor according to the present invention has a high stability and a high efficiency. The high stability is achieved in that the slowly dropping degree of reaction is suddenly and sharply raised with the aid of the front highly-deflecting guide baffle. Due to the slow drop and the fast rise of the degree of reaction, more guide baffles are relieved than loaded.

In one preferred exemplary embodiment, the at least one highly-deflecting guide baffle is not adjustable and the non-highly-deflecting guide baffles in the front compressor area are adjustable.

Preferably, the non-highly-deflecting guide baffles in the rear compressor area are not adjustable. Thus, the complexity of the compressor is reduced, the non-highly-deflecting guide baffles are, for example, designed conventionally and enable a slow, steady drop of the degree of reaction.

To improve an inflow of the combustion chamber area, it is advantageous if the main flow supplied to the combustion chamber area is free of swirl or the swirl is at least reduced. In an axial compressor, this means an axial, swirl-free direction of the main flow. To free or reduce the main flow from swirl, at least partially, an exemplary embodiment provides for situating a highly-deflecting outlet guide baffle downstream from the rear compressor area.

The outlet guide baffle is advantageously not adjustable. Due to this measure, the vanes are located in a defined position so that displacements of the vanes may not occur.

The stability and the efficiency of compressors with high numbers of stages, for example, at least eight (8) stages, may be further improved if at least one highly-deflecting intermediate guide baffle, which is located between the at least one highly-deflecting guide baffle and the outlet guide baffle, an intermediate compressor area with non-highly-deflecting guide baffles is located upstream of this intermediate guide baffle, and the degree of reaction is raised again with the aid of this intermediate guide baffle. Depending on the number of intermediate guide baffles, each guide baffle between the highly-deflecting guide baffles may be individually influenced, or the degree of reaction may be individually adjusted for each guide baffle. The degree of reaction thus has a sawtooth-shaped curve.

To avoid a high complexity of the compressor, it is advantageous if the at least one highly-deflecting intermediate guide baffle is not adjustable and the non-highly-deflecting guide baffle in the intermediate compressor area is not adjustable.

For example, highly-deflecting guide baffles have tandem arrangements. The tandem arrangements may form multiple rows of blades and each may be provided with two, three, or more vanes.

A preferred turbomachine has a compressor according to the present invention or a compressor, which is operated according to the method according to the present invention. Thus, the turbomachine is characterized by a high stability and also by a high efficiency.

BRIEF DESCRIPTION OF THE DRAWINGS

In the following, preferred exemplary embodiments of the present invention are explained in greater detail by way of the schematic illustrations.

DETAILED DESCRIPTION

As already mentioned at the outset, a compressor-side degree of reaction of a turbomachine in the context of the present invention is calculated, in a simplified way, according to the following formula, based on metal angles:

$$R = \frac{\tan\frac{\beta_1 + \beta_2}{2}}{\tan\frac{\beta_1 + \beta_2}{2} + \tan\frac{\alpha_1 + \alpha_2}{2}}$$

Figure 1:
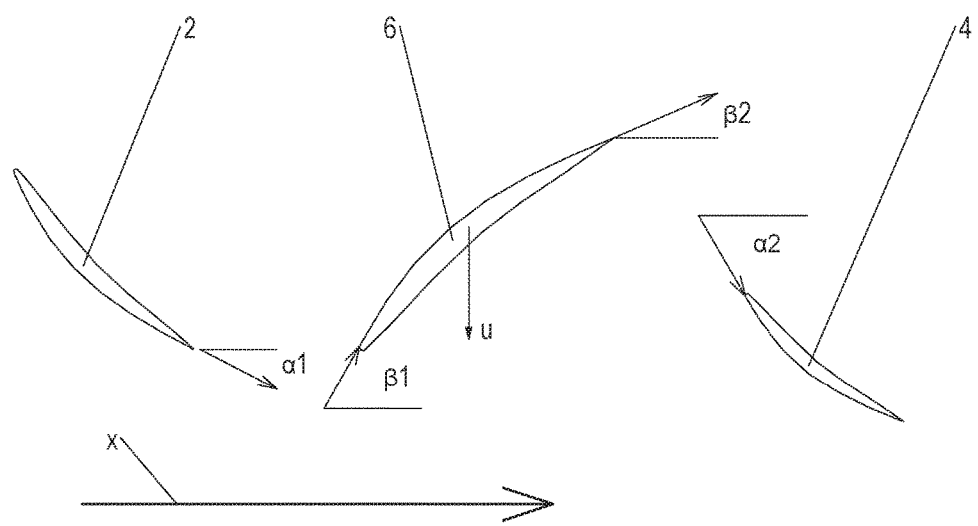
FIG. 1 shows a diagram to define a compressor-side degree of reaction.

The angles $\alpha_1$, $\alpha_2$, $\beta_1$, $\beta_2$ are, as shown in FIG. 1, are marked between tangents of the respective camber line and an axial flow direction x of the turbomachine. $\alpha_1$ is marked from the trailing edge of a guide blade 2 of a row of guide blades n−1. $\alpha_2$ is marked toward the leading edge of a guide blade 4 of a row of guide blades n. $\beta_1$ is marked toward the leading edge of a moving blade 6 of a row of moving blades n. $\beta_2$ is marked from the trailing edge of moving blade 6 of a row of moving blades n. Moving blade 6 or row of moving blades n thereby passes through between guide blades 2, 4 or rows of guide blades n−1, n in the circumferential direction u. Letter n designates whole number multiples of 1, 2, etc. In compressors, the degree of reaction usually moves in a range from 0.5 through 1.0. In turbines, it usually moves between 0.0 . . . 0.05 and 0.5. The degree of reaction is viewed across the axial width of the compressor from its compressor inlet up to the compressor outlet.

Figure 2:
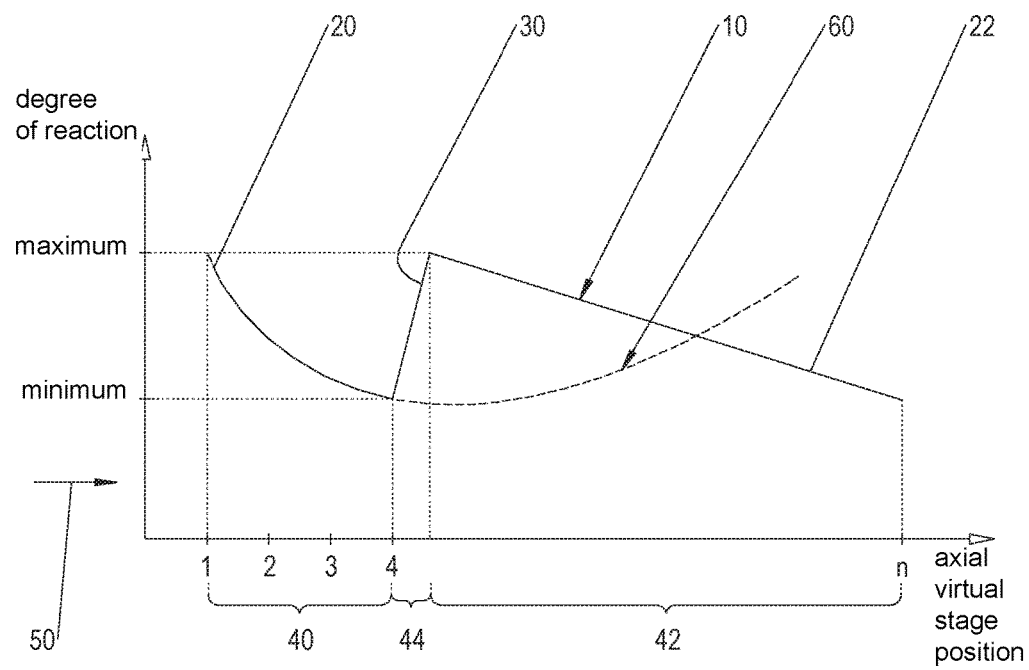
FIG. 2 shows a curve of a degree of reaction in a first exemplary embodiment according to the present invention.

FIG. 2 shows a curve of a degree of reaction 10 according to the present invention according to a first exemplary embodiment of a compressor of a turbomachine according to the present invention. The compressor is in this case an axial compressor and the turbomachine is, for example, an aircraft engine. According to the present invention, degree of reaction 10 dropping slowly to a minimum in the compressor is quickly raised again and then slowly drops again. Degree of reaction 10 thus has two slowly dropping sections 20, 22, and one quickly, steeply rising section 30. In other words, degree of reaction 10 drops in two compressor areas 40, 42 more slowly than it is raised in a compressor area 44 situated between these compressor areas 40, 42, or degree of reaction 10 is raised more quickly in a compressor area 44 than it drops in a front compressor area 40 and a rear compressor area 42.

In the context of the present invention, "highly-deflecting" means a de Haller number lower than 0.65, alternatively a degree of diffusion greater than 0.6. "Non-highly-deflecting" means a de Haller number preferably greater than 0.70. The quotient (v2/v1) of an inflow velocity v1 of a cascade and an inflow velocity v2 of the cascade is the de Haller number.

The compressor inlet transitions in the direction of a main flow 50 flowing through the compressor or downstream into front compressor area 40. The compressor outlet is situated downstream from rear compressor area 42.

Front compressor area 40 includes adjustable and non-highly-deflecting guide baffles. These guide baffles are thus adjusting guide baffles. In the exemplary embodiment shown here, the front compressor area includes the $1^{st}$, $2^{nd}$, and $3^{rd}$ guide baffles of the compressor. Their design is conventionally carried out. The drop in the degree of reaction to the minimum takes place advantageously parabolically.

Figure 3:
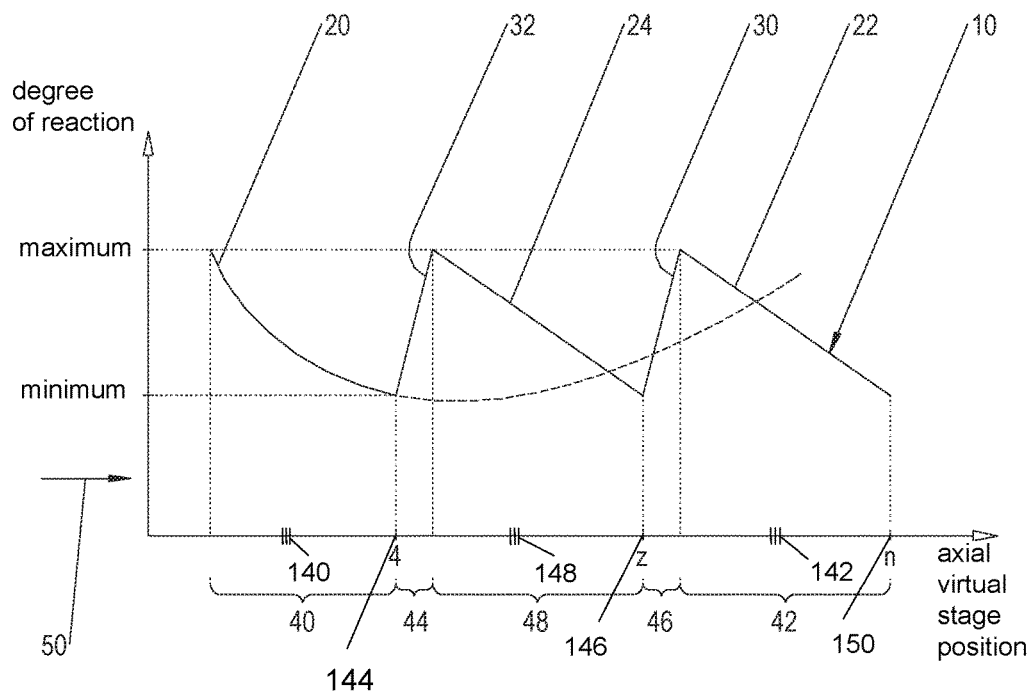
FIG. 3 shows a curve of a degree of reaction in a second exemplary embodiment according to the present invention.

Rear compressor area 42 includes not adjustable and non-highly-deflecting guide baffles 142 (FIG. 3). The design of the guide baffles is less loaded and in particular in such a way that a steady, linear drop of degree of reaction 10 takes place via the guide baffles.

Directly downstream from rear compressor area 42, virtually at the end of rear compressor area 42, a guide baffle is implemented as a highly-deflecting outlet guide baffle at axial position n. For example, the outlet guide baffle includes tandem arrangements with at least 2 rows of blades in each case. It is used for freeing main flow 50 of swirl in order to supply the same swirl-free or virtually swirl-free to a subsequent combustion chamber area.

A not adjustable, highly-deflecting guide baffle is situated between front compressor area 40 and rear compressor area 42 in compressor area 44. The highly-deflecting guide baffle includes, for example, tandem arrangements with at least 2 vanes in each case. In the exemplary embodiment shown here with an adjustable front guide baffle and three adjustable guide baffles or adjustable stator baffles, this guide baffle or stator baffle is the $4^{th}$ guide baffle and thereby the first not adjustable guide baffle. Together with a downstream, adjacent moving baffle, it forms a so-called $5^{th}$ virtual stage. Virtual stage means that it is the $4^{th}$ guide baffle and the $5^{th}$ moving baffle. Degree of reaction 10 is sharply increased at the inlet of the $5^{th}$ moving baffle. The rise takes place here to the inlet-side maximum. It should be mentioned, however, that the rise may also be raised to a value below or above the maximum.

At its inlet, the compressor has a high degree of reaction 10. This drops slowly in front compressor area 40 across the, in this case, four, non-highly-deflecting guide baffles (one front guide baffle and three stator baffles) to a minimum. With the aid of the $4^{th}$ guide baffle or via the $5^{th}$ virtual stage, degree of reaction 10 is quickly sharply raised, for example, to the height of the inlet-side degree of reaction. In rear compressor area 42, degree of reaction 10 drops again across multiple virtual stages slowly to a new minimum. Main flow 50 exiting from rear compressor area 42 strikes the outlet guide baffle, loaded with swirl, at minimum degree of reaction 10 and is freed thereby from swirl or virtually freed from swirl. After the freeing from swirl, main flow 50 leaves the compressor at the outlet and enters into the combustion chamber area swirl-free.

The non-highly-deflecting guide blades are relieved by the degree of reaction curve with dropping sections 20, 22 in front and rear compressor areas 40, 42, because a dropping degree of reaction means an aerodynamic relief. A plurality of guide baffles and, in particular, the majority of guide baffles are relieved by the respective slow reductions of the degree of reaction, i.e., the reduction of the degree of reaction 10 takes place across several guide baffles. In addition, the plurality of guide baffles may be provided with a lower number of blades than conventional guide baffles in comparable axial compressor positions, which results in an increase in efficiency.

Due to the high degree of reaction 10 in the compressor directly after compressor area 44, a high stability is achieved, which has particularly favorable effects in partial load operation.

With the aid of the highly-deflecting outlet guide baffle, main flow 50 is quickly freed from its swirl or residual swirl, so that the dropping degree of reaction 10 is used directly up to the outlet guide baffle.

For additional illustration of degree of reaction 10 according to the present invention, a curve of a conventional degree of reaction 60 is likewise outlined in FIG. 2 as a dashed curve, rising slowly after the minimum or after the adjustment guide baffles across all subsequent guide baffles.

FIG. 3 shows a curve of a degree of reaction 10 according to a second exemplary embodiment of a compressor of a turbomachine according to the present invention. In contrast to the first exemplary embodiment according to FIG. 2, degree of reaction 10 shows in this case three slowly dropping sections 20, 22, 24 and two quickly and steeply rising sections 30, 32. A sawtooth-shaped curve thus results. This sawtooth-shaped curve may be supplemented by additional dropping sections 20, 22, 24 and quickly and steeply rising sections 30, 32.

Baffles 140, 142, 144, 146, 148 and 150 are shown schematically.

A highly-deflecting intermediate guide baffle 146 is situated at an axial position z or in a compressor area 46 between a first highly-deflecting, not adjustable guide baffle 144 at the $4^{th}$ axial position according to the exemplary embodiment according to FIG. 1, or in compressor area 44, and a not adjustable, highly-deflecting outlet guide baffle 150.

The intermediate guide baffle 146 is designed here according to the $4^{th}$ guide baffle or stator baffle so that degree of reaction 10, which has dropped to a minimum in an intermediate compressor area 48 between the first highly-deflecting guide baffle and the intermediate guide baffle, is sharply raised again. Preferably, it is raised to the original maximum at the compressor inlet. Together with a downstream moving row, it forms the z+1 virtual stage. For example, the front guide baffle and the intermediate guide baffle have tandem arrangements.

The guide baffles 148 in intermediate compressor area 48 and in rear compressor area 42 are not adjustable and non-highly-deflecting. They are designed in such a way that degree of reaction 10 slowly drops to the minimum up to the intermediate guide baffle or outlet guide baffle. In comparison to the exemplary embodiment according to FIG. 2, degree of reaction 10 is reduced across a lower number of guide baffles and thus more quickly to a minimum. Since the raise of degree of reaction 10, however, only takes place across one guide baffle or intermediate guide baffle, the decrease in the degree of reaction in the second exemplary embodiment is also slow in comparison to the increase in the degree of reaction.

The output guide baffle 150 downstream of rear compressor area 42 at axial position n is designed according to the first exemplary embodiment as a not adjustable, highly-deflecting guide baffle for freeing the main flow from swirl.

The guide baffles 140 in front compressor area 40 upstream from the first highly-deflecting guide baffle are designed according to the first exemplary embodiment according to FIG. 2 as four non-highly-deflecting adjustment guide baffles, and namely in the exemplary embodiment shown here as an adjustable front guide baffle and three downstream, adjustable stator baffles.

A method is disclosed for operating a compressor of a turbomachine, in which, when viewed in the direction of a main flow, a slowly dropping degree of reaction being more quickly raised in one compressor area than it previously dropped, and then the raised degree of reaction being reduced again in a subsequent compressor area more slowly than it was previously raised, a compressor of a turbomachine with at least one degree of reaction rising more quickly in one compressor area in comparison to adjacent compressor areas with respectively dropping degrees of reaction, thus, a sawtooth-shaped curve of the degree of reaction results, and a turbomachine including a compressor of this type.

LIST OF REFERENCE NUMERALS 2 guide blade—stage n−1
4 guide blade—stage n
6 moving blade—stage n
8 degree of reaction
20 dropping section
22 dropping section
24 dropping section
30 rising section
32 rising section
40 compressor area
42 compressor area
44 compressor area
46 compressor area
48 intermediate compressor area
50 main flow
140, 142, 144, 146, 148, 150 baffles

What is claimed is:

1. A method for operating a compressor of a turbomachine, the method comprising:
    slowly dropping a degree of reaction; and, with respect to a main flow direction,
    quickly raising in a compressor area the degree of reaction; and
    slowly reducing the raised degree of reaction again.

2. The method as recited in claim 1 wherein the degree of reaction is quickly raised several times and respectively slowly drops after the raise.

3. The method as recited in claim 1 wherein a swirl of the main flow is reduced after the slow drop of the degree of reaction.

4. A compressor of a turbomachine comprising at least one highly-deflecting guide baffle for raising a degree of reaction, the highly-deflecting baffle situated, with respect to a main flow direction, between a front compressor area and a rear compressor area, the degree of reaction slowly dropping in the front and rear compressor areas.

5. The compressor as recited in claim 4 wherein the at least one highly-deflecting guide baffle is not adjustable and further comprising adjustable non-highly-deflecting guide baffles in the front compression area.

6. The compressor as recited in claim 4 further comprising non-adjustable non-highly-deflecting guide baffles in the rear compressor area.

7. The compressor as recited in claim 4 further comprising a highly-deflecting outlet guide baffle for reducing a swirl of the main flow situated downstream of the rear compressor area.

8. The compressor as recited in claim 4 wherein the highly-deflecting outlet guide baffle is not adjustable.

9. The compressor as recited in claim 4 further comprising at least one highly-deflecting intermediate guide baffle for raising the degree of reaction situated between the at least one highly-deflecting guide baffle and an outlet guide baffle, an intermediate compressor area with non-highly-deflecting guide baffles being upstream from the intermediate guide baffle.

10. The compressor as recited in claim 9 wherein the at least one highly-deflecting intermediate guide baffle is not adjustable and further comprising non-adjustable non-highly-deflecting guide baffles in the intermediate compressor area.

11. The compressor as recited in claim 4 wherein the highly-deflecting guide baffle is a tandem guide baffle.

12. A turbomachine comprising the compressor as recited in claim 4.

13. A turbomachine operated according to the method as recited in claim 1.

14. A method for operating a compressor of a turbomachine, the method comprising:
dropping degree of reaction at a first rate; and, with respect to a main flow direction,
raising in a compressor area the degree of reaction at a second rate more quickly than the first rate; and
reducing the raised degree of reaction again at a third rate more slowly than the second rate.

* * * * *